United States Patent
Hirata et al.

(12) 
(10) Patent No.: US 6,333,089 B1
(45) Date of Patent: Dec. 25, 2001

(54) SUBSTRATE FOR INFORMATION RECORDING DISK, MOLD AND STAMPER FOR INJECTION MOLDING SUBSTRATE, AND METHOD FOR MAKING STAMPER, AND INFORMATION RECORDING DISK

(75) Inventors: Hiroyuki Hirata; Tatsuo Araki, both of Ohtsu; Osamu Ishizaki, Suita; Hideo Daimon, Ibaraki; Yasuhiko Kokufuda; Tsuyoshi Maro, both of Kyoto; Makoto Aihara, Fujisawa, all of (JP)

(73) Assignee: Hitachi Maxwell, Ltd., Osaka (JP)

( * ) Notice: Subject to any disclaimer, the term of this patent is extended or adjusted under 35 U.S.C. 154(b) by 0 days.

(21) Appl. No.: 09/628,645

(22) Filed: Jul. 28, 2000

Related U.S. Application Data

(62) Division of application No. 09/069,817, filed on Apr. 30, 1998, now Pat. No. 6,127,017.

(30) Foreign Application Priority Data

Apr. 30, 1997 (JP) .................................... 9-126526
May 28, 1997 (JP) .................................... 9-154438
Oct. 28, 1997 (JP) .................................... 9-311249

(51) Int. Cl.$^7$ ............................................ B32B 3/02
(52) U.S. Cl. .................. 428/64.1; 428/64.4; 428/457; 428/913; 430/495.1; 425/385; 425/542

(58) Field of Search ...................... 428/64.1, 64.2, 428/64.4, 457, 913; 430/495.1, 945; 425/542, 385

(56) References Cited

U.S. PATENT DOCUMENTS

| | | | |
|---|---|---|---|
| 4,793,792 | * 12/1988 | Akino | 425/385 |
| 5,484,324 | * 1/1996 | Okabayashi | 451/28 |
| 5,756,130 | * 5/1998 | Umebayashi | 425/385 |
| 6,120,870 | * 9/2000 | Nebashi | 428/64.1 |

* cited by examiner

Primary Examiner—Elizabeth Evans
(74) Attorney, Agent, or Firm—Birch, Stewart, Kolasch & Birch, LLP

(57) ABSTRACT

A cavity surface-forming plate of a mold for injection-molding a plastic substrate is coarsely polished, and then a surface for defining a cavity is applied with electroless Ni—P plating. The surface of the plating is polished with abrasive grains to obtain surface roughness of $Ra \leq 2.0$ nm and $Rmax \leq 22$ nm. The plastic substrate molded with the mold has smoothness equivalent to the polished plating surface. A concave-convex pattern for forming pits may be formed on the cavity surface. A magnetic disk or an optical disk provided with the substrate makes it possible to realize the near contact system for a magnetic or magneto-optical head. Thus, it is possible to realize high density recording.

23 Claims, 11 Drawing Sheets

SUBSTRATE FOR INFORMATION RECORDING DISK, MOLD AND STAMPER FOR INJECTION MOLDING SUBSTRATE, AND METHOD FOR MAKING STAMPER, AND INFORMATION RECORDING DISK

This application is a divisional of application Ser. No. 09/069,817, filed on Apr. 30, 1998, now U.S. Pat. No. 6,127,017 issued Oct. 3, 2000 the entire contents of which are hereby incorporated by reference.

BACKGROUND OF THE INVENTION

1 Field of the Invention

The present invention relates to a substrate for information-recording media molded by injection molding, and a mold and a stamper for producing the same. In particular, the present invention relates to a plastic substrate preferably used for an information-recording disk capable of high density recording, a mold and a stamper to be used for injection molding for producing the same, a method for producing the stamper, and an information-recording disk such as a magnetic disk and an optical disk based on the use of the plastic substrate.

2 Description of Related Art

The age of multimedia has come. Accordingly, it becomes necessary, for information-recording devices used, for example, for general purpose computers, to deal with not only character information but also sound and image information. Therefore, it is required to further increase the storage capacity. In order to respond to this request, for example, it has been investigated to perform high density recording on the hard disk as an external recording device for the computer. A substrate made of an aluminum alloy such as Al-Mg has been hitherto used as a substrate for the hard disk. The substrate made of aluminum alloy is usually produced in accordance with the following process. At first, an aluminum plate, which is rolled to have a desired thickness, is subjected to press working to give a disk-shaped configuration. Distortion is removed therefrom by means of heat treatment, and then the inner and outer diameters are adjusted by means of cutting work. After that, the edge is subjected to chamfering work, and then the surface of the disk is subjected to electroless plating with Ni—P in a degree of 15 µm to increase the surface hardness of the substrate. Finally, in order to obtain the smoothness and the flatness, the surface is subjected to lapping or polishing to finish it into a mirror-finished surface by using grinding abrasive grains such as alumina, silica, and diamond.

Recently, for example, in order to reduce the weight of the magnetic disk, improve the productivity, and decrease the production cost, it has been suggested that the substrate for the magnetic disk is produced in the same manner as the optical disk. For example, Japanese Patent Application Laid-Open No. 63-255816 discloses a method for producing a substrate made of resin for magnetic disks by injecting molten resin into a mold formed with ring-shaped minute recesses. The minute recesses are provided in order to reduce the torque which is applied upon starting of the rotation of the magnetic disk which adopts the contact start stop (CSS) system so that the magnetic disk is prevented from abrasion.

Conventionally, when the magnetic disk is subjected to physical format, it is necessary to record the format signal on the all area on the disk by using a magnetic head. Therefore, the conventional technique has required a lot of time. In order to deal with this problem, Japanese Patent Application Laid-Open No. 3-86912 discloses a magnetic disk as a new form of the magnetic disk, in which the preformat signal such as a servo signal is formed as a concave-convex structure on a resin substrate by means of injection molding, and a magnetic metal thin film is formed thereon. When the servo signal is read from the magnetic disk, the magnetic metal thin film is forcibly magnetized in one direction so that the leakage magnetic field, which is generated by the concave-convex structure of the magnetic metal thin film, is detected by using a magnetic head. The magnetic disk of this type can be produced by means of replication based on, for example, a method of injection molding by using a material of a master disk provided with accurately arranged tracking servo pits and guard band grooves for magnetically separating tracks from adjacent tracks. Therefore, a magnetic disk having a large capacity, on which physical format has been previously completed, can be provided cheaply in a large amount.

However, when an underlying layer or a magnetic layer is formed on the substrate by means of sputtering, a problem arises in that the substrate is deformed, and residual strain occurs, due to heating caused by the sputtering. In order to deal with this problem, for example, Japanese Patent Application Laid-Open No. 64-50236 discloses a method for producing a substrate for magnetic disks, in which injection molding is performed while setting the temperature of an injection molding mold to be at a temperature within a predetermined range lower than the glass-transition temperature of a resin used to produce the substrate, followed by annealing within a predetermined temperature range. Recently, a technique has been developed, which makes it possible to perform sputtering even at ordinary temperature. The problem concerning the deformation due to heating as described above is being gradually solved.

In order to increase the recording density of the magnetic disk, the near contact system is being developed, which makes it possible to decrease the floating amount of the recording magnetic head as small as possible. The near contact system allows the magnetic flux to be concentrated on a narrow range in the recording area. Therefore, it is possible to form minute magnetic marks at a high density. On the other hand, upon reproduction, the nearer the magnetic head approaches the magnetic disk surface, the larger the obtained reproduction output is. Therefore, it is desirable to realize the near contact system. For example, it has been known that when the floating height of the magnetic head from the magnetic disk surface is decreased from 40 nm to 20 nm, the reproduction output of the head is increased by about 20%.

In the case of the magnetic disk, in order to realize the near contact system, a floating head supported by a slider is adopted. The floating head of this type is operated as follows. That is, the air flow is thrust into a wedge-shaped gap formed between the slider and the magnetic disk in accordance with movement of the magnetic disk to generate a pressure thereby. The pressure allows the floating head to float over the disk rotating at a high speed, with an extremely narrow spacing distance intervening therebetween.

However, the substrate, which is molded by using the conventional injection molding mold, is insufficient in smoothness of the surface of the obtained substrate. For this reason, the floating amount of the floating head becomes high, making it difficult to realize the near contact system.

Recently, concerning the recording and reproduction apparatus for optical information-recording disks such as magneto-optical disks, the high speed access and the high speed recording have been investigated, which may be realized by embedding the optical head in the floating slider. For example, Japanese Patent Application Laid-Open No. 8-266369 discloses a magneto-optical disk recording and reproduction apparatus comprising a head provided with a solid immersion lens and a slider fixed at the tip of a sector-shaped swing arm. The recording and reproduction apparatus makes it possible to perform high speed access and high density recording, although it is extremely compact. The near contact system is also required for the optical disk such as the magneto-optical disk subjected to recording and reproduction by using such a floating type optical head, in the same manner as the magnetic disk.

Usually, the substrate for the optical disk such as the optical disk and the compact disk (CD) is produced by injection-molding a resin while installing a stamper formed with a concave-convex preformat pattern in a mold in an injection molding machine. However, when such a stamper is used, the stamper tends to be deformed during injection of the resin due to the heat of the molten resin and the pressure applied during the clamping process, as well as due to the difference in coefficient of thermal expansion between the stamper and the mold. The deformation of the stamper as described above brings about waviness and retardation of the substrate as a molded product.

In the case of the thin film type recording medium based on the use of the substrate made of resin described above, when the substrate is produced by injection molding by using the conventional stamper (almost all of available conventional stampers are made of pure Ni), the stamper made of Ni undergoes elastic deformation due to a large pressure (up to 500 kg/cm$^2$) applied during the molding process, because the hardness of Ni is not more than 300 Hv as represented by Vickers hardness which is low, and the thickness is thin. The deformation (waviness) occurs as those having various cycles (wavelengths). The waviness having a cycle of waviness of not more than 10 mm has a height of waviness of not less than 50 nm. The elastic deformation of the Ni stamper is transferred to the substrate through the process of injection molding. The amount of deformation in such a degree has scarcely caused problem in the case of the conventional magneto-optical disk. However, in the case of the magnetic disk based on the use of the substrate and the magneto-optical recording medium of the new concept having the high density with the optical head embedded in the floating type slider to make high speed access, any head crash may occur during recording and reproduction, because the floating type slider has a small floating amount, and the floating type slider fails to follow minute waviness and irregularities of the substrate. Even when no crash occurs, problems arise in that the reproduction signal undergoes fluctuation or variation, and the tracking is not effected well, because the minute waviness exists on the substrate.

The new type magneto-optical recording system, in which information is recorded and reproduced by using the nearfield light as described above, involves the restriction that the propagation distance of the nearfield light is about ¼ of the wavelength. For this reason, recording and reproduction should be performed while highly accurately positioning the floating type head with an extremely narrow spacing distance with respect to the magneto-optical recording medium. Therefore, the waviness of the substrate as described above is an extremely serious problem when it is intended to realize the recording and reproduction process by using the nearfield light.

SUMMARY OF THE INVENTION

The present invention has been made in order to solve the problems described above, an object of which is to provide a substrate for information-recording media having an extremely flat surface and an information-recording disk provided with the same. Another object of the present invention is to provide an injection molding mold, a stamper, and a method for producing the stamper necessary to produce the substrate for information-recording media having the extremely flat surface.

According to a first aspect of the present invention, there is provided a substrate for an information-recording disk, the substrate being molded by charging a mold with a molten resin, wherein:

a height of waviness having a cycle of not more than 10 mm is less than 50 nm.

In the substrate for the information-recording disk according to the present invention, the height of the waviness having the cycle (wavelength) of not more than 10 mm existing on the substrate surface is less than 50 nm. Accordingly, when a film such as a magnetic film is formed on the substrate for the information-recording disk, it is possible to produce an information-recording medium having an extremely flat surface. Therefore, for example, even when information is recorded and reproduced by using the floating type head provided with the air slider, no head crash occurs. It is possible to avoid variation in amplitude of the reproduction signal and occurrence of tracking error. Thus, information can be recorded and reproduced in a well-suited manner.

Those preferably used as a material for the substrate for the information-recording disk of the present invention include resins such as polycarbonate, norbornene type amorphous polyolefin, polyetherimide, polyethersulfone, and phenol resin.

According to a second aspect of the present invention, there is provided an injection molding mold for injection-molding a substrate for an information-recording disk, wherein:

at least a part of a cavity surface for forming a recording surface of the information-recording disk in the mold has a surface roughness of Ra≦2.0 nm and Rmax≦22 nm.

In the mold according to the present invention, the cavity surface for forming the recording surface of the information-recording disk in the injection molding mold has the surface roughness of Ra≦2.0 nm and Rmax≦22 nm. Accordingly, the obtained surface of the resin substrate obtained by injection molding has smoothness and flatness approximately equivalent to the surface roughness of the cavity surface. Therefore, the magnetic disk, which is obtained by using the substrate, also has the same smoothness and the same flatness, making it possible to realize the near contact system based on the use of the floating heat. Thus, it is possible to realize the high density recording, and it is possible to obtain sufficient reproduction output. On the contrary, if Ra exceeds 2.0 nm, and Rmax exceeds 22 nm, then a substrate molded under this condition has its surface roughness corresponding thereto. When a magnetic disk produced by using such a substrate is subjected to recording, it is impossible to perform high density recording, because the glide height of the magnetic head is increased. Further, the reproduction output also varies during reproduction. The surface roughness of the present invention as described above is achieved by means of lapping or polishing.

In this specification, Ra and Rmax, which represent the surface roughness, are based on the JIS-B0601 standard.

Those usable as the apparatus for measuring the surface roughness include, for example, TOPO-2D·3D produced by WYKO based on the use of the phase contrast measurement method, Sufcom 920A produced by Tokyo Seimitsu based on the use of the astigmatism method, and Nano Scopell produced by Digital Instruments as an AFM interatomic microscope. In the embodiment of the present invention, TOPO-2D·3D produced by WYKO is used.

The injection molding mold according to the second aspect of the present invention has the following structure. That is, when a magnetic disk is produced, it is possible to use the same structure as that of the mold for injection-molding a plastic substrate for an optical disk except that no stamper is installed, and the cavity surface is processed (processed into a mirror-finished surface) to give the predetermined smoothness. In other words, the mold may comprise, for example, a stationary cavity surface of a stationary mold, a movable cavity surface of a movable mold, a stationary retainer plate, a movable retainer plate, a gate cut punch, a spool bush, a locating ring, an ejector sleeve, and a spool ejector pin. Only one cavity surface disposed on the stationary side or the movable side may be mirror-finished, or both surfaces disposed on the stationary side and the movable side may be mirror-finished. The cavity surface to be mirror-finished may be selected depending on the recording surface of the magnetic disk. In order to increase the storage capacity of the magnetic disk, it is desirable that the both cavity surfaces disposed on the stationary side and the movable side are mirror-finished. When it is intended to mirror-finish any one of the cavity surfaces disposed on the stationary side and the movable side, it is preferable that the stationary cavity surface is used as a surface for forming a recording area, because no projecting mechanism for the molded substrate is provided for the stationary cavity surface, the mold structure is simple, and it is possible to form a large recording area.

In the mold for molding the information-recording disk substrate according to the second aspect of the present invention, metal plating is previously applied to the cavity surface for forming the recording surface of the information-recording disk. Accordingly, it is possible to easily obtain, at low cost, a mirror-finished surface (super mirror-finished surface) of the cavity having extremely high smoothness. In the conventional mirror-finishing processing, for example, it has been necessary to consider selective use of steel materials in order to avoid surface defects such as pin holes and projections of the steel materials. However, the formation of the metal plating and the surface polishing, which are one of forms of the mirror-finishing processing respectively to be performed according to the present invention, make it possible to obtain the stable mirror-finished surface without being affected by the quality of the steel material.

Various types of metal plating may be used for the metal plating procedure. Those usable include, for example, electroplating based on the use of Ni, Ni—P, Ni—Co, Ni—W—P, Co—Ag, Ag—Pd, and Ag—Rh, and chemical plating such as electroless plating based on the use of Ni—P and Ni—B. Among them, it is desirable to use Ni or Ni-alloy plating, in view of the uniformity, the dense property, and the adhesive property to the base material of the film. Further, it is preferable to use the plating of Ni—P, Ni—B, Ni—Co, Ni—W—P, and Co—Ag in view of the surface hardness.

The thickness t of the plating preferably satisfies $1 \mu m \leq t \leq 80 \mu m$. If the plating thickness is less than $1 \mu m$, it is difficult to obtain the smooth surface for reflecting the surface state of the base material. If the plating thickness exceeds $80 \mu m$, then a long time may be required for the plating, or any stress may appear on the plating, which may deteriorate the flatness of the substrate. More preferably, the plating thickness t satisfies $10 \mu m \leq t \leq 30 \mu m$. When the metal plating is applied to the cavity surface as described above, the metal plating surface can be mirror-finished by means of lapping or polishing based on the use of grinding adhesive grains.

The mold according to the second aspect of the present invention may comprise a concave-convex pattern at least at a part of the cavity surface. The concave-convex pattern may correspond to at least one of a landing zone texture for starting the operation of a recording or reproducing head, a preformat pattern, and a data pattern. The landing zone texture for starting the operation of the recording or reproducing head refers to a concave-convex pattern provided on the disk surface in order to decrease the torque applied upon the starting of rotation of the information-recording disk by the floating type head which adopts the CSS system so that the magnetic disk is prevented from abrasion. The floating type head as described above includes not only the magnetic head but also heads such as magneto-optical heads and optical heads used for recording and reproduction on arbitrary information-recording media such as magneto-optical disks and optical disks. The preformat pattern includes all concave-convex patterns relevant to format information, such as the servo pit for tracking servo, the address pit, the guard band, the guide groove, the groove for land/groove recording. The data pattern includes, for example, the recording pit included in the recording area.

The concave-convex pattern on the information-recording disk of the present invention can be obtained by forming a concave-convex pattern corresponding to the concave-convex pattern on the cavity surface for forming the recording surface of the information-recording disk in the injection molding mold, and injection-molding the resin in the mold. The height (depth) of the concave-convex pattern formed on the cavity surface is preferably 20 nm to 200 nm, considering the concave-convex pattern formed on the substrate. More preferably, the depth of the concave-convex pattern is 20 nm to 40 nm in the case of the landing zone texture for starting the operation of the head of the magnetic disk, and it is 80 nm to 200 nm in the case of the preformat pattern. The depth of the concave-convex pattern of the optical disk is 30 nm to 50 nm in the case of the landing zone texture for starting the operation, and it is 50 nm to 200 nm in the case of the preformat pattern.

The concave-convex pattern may be formed such that recesses are formed with a predetermined pattern on the Ni—P plating surface, for example, when the cavity surface is formed with the Ni—P plating. Alternatively, projections having a predetermined pattern may be formed on the Ni—P plating surface. When a projection pattern is formed on the Ni—P plating surface, it is preferable that a metal layer of Ti, Ta, Al, or an alloy containing at least one of these elements is formed on the Ni—P plating surface by means of sputtering or the like, followed by performing etching for the pattern by means of reactive plasma etching.

According to a third aspect of the present invention, there is provided a stamper for a mold used for molding a substrate for an information-recording disk by injecting and charging a molten resin into the mold, wherein a part of the stamper to make contact with the molten resin has a Vickers hardness of not less than 500 Hv.

The part of the stamper according to the present invention to make contact with the molten resin is formed of a material having the Vickers hardness of not less than 500 Hv.

Accordingly, even when the stamper according to the present invention is installed to the injection molding mold, and the molten resin is injected and charged into the mold to apply a pressure of about 500 kg/cm² at the maximum in the mold, then the elastic deformation of stamper is avoided, which would be otherwise caused by the pressure of the molten resin. Therefore, the plastic substrate, which is extremely excellent in flatness, is obtained by performing injection molding by using the stamper according to the present invention.

It is desirable that the part of the stamper to make contact with the molten resin is composed of a material having a high hardness such as Ni—P, Ni—B, Ni—Co, and Co—Ag. The entire stamper may be composed of such a material. Alternatively, the stamper may be composed of two layers having different Vickers hardnesses. In this case, the layer disposed on the side to make contact with the molten resin may have a Vickers hardness of not less than 500 Hv, and the layer disposed on the side to be installed to the mold may have a Vickers hardness of not more than 300 Hv. By doing so, it is possible to avoid scuffing of the stamper which would be otherwise caused on the side to be installed to the mold. The layer of the stamper disposed on the side to make contact with the molten resin can be composed of, for example, Ni—P, Ni—B, Ni—Co, or Co—Ag as described above. However, there is no limitation to these materials. The layer of the stamper disposed on the side to make contact with the molten resin can be formed by using an arbitrary material provided that the material has a Vickers hardness of not less than 500 Hv after the film is formed. The layer of the stamper disposed on the side to be installed to the mold is preferably composed of pure Ni. However, there is no limitation to this material in the present invention. The layer disposed on the side to be installed to the mold can be formed by using another material having a Vickers hardness of not more than 300, for example, a material such as FeCo. When the stamper according to the present invention is produced, it is advantageous to use a plating method in which the film deposition speed is large.

According to a fourth aspect of the present invention, there is provided a method for producing a stamper composed of a low hardness layer having a Vickers hardness of not more than 300 Hv and a high hardness layer having a Vickers hardness of not less than 500 Hv, the method comprising the step of:

performing plating in accordance with an electroplating method by using plating baths having different bath compositions to form the high hardness layer and the low hardness layer respectively.

According to the method for producing the stamper of the present invention, the stamper having the two-layered structure, which is composed of the high hardness layer having the high Vickers hardness and the low hardness layer having the low Vickers hardness, can be produced by using the two plating baths having the different bath compositions. The stamper having the two-layered structure with different hardnesses can be produced, for example, by forming the high hardness layer by means of the plating with the plating bath with which the high hardness is obtainable, followed by transfer to the plating bath with which the low hardness is obtainable so that the low hardness layer is formed by means of the plating.

A fifth aspect of the present invention lies in a stamper for injection-molding a substrate for an information-recording disk. That is, there is provided a stamper for a mold to be used for molding a substrate for an information-recording disk by injecting and charging a molten resin into the mold, wherein:

a part of the stamper to make contact with the molten resin has a Vickers hardness of not more than 300 Hv, and a thickness of the stamper is not less than 0.4 mm. The elastic deformation of the stamper can be avoided, and the flatness of the injection-molded substrate can be improved by allowing the stamper to have the thickness of not less than 0.4 mm even when the Vickers hardness is not more than. 300 Hv which is low. In a preferred embodiment, Ag sputtering is performed for the side opposite to the transfer surface of the stamper, followed by heating, for example, at about 300° C. so that the stamper is glued to a reinforcing plate by the aid of Ag. The use of the reinforcing plate also provides the same effect as that obtained when the thickness of the stamper is not less than 0.4 mm. Ag functions as an adhesive.

Further, according to the present invention, there is provided a substrate produced by using the mold of the present invention. There is also provided an information-recording disk provided with the substrate produced in accordance with the present invention. The information-recording disk may be embodied as an optical disk such as a compact disk (CD), a digital versatile disk (DVD), a write-once optical disk (CD-R), and a magneto-optical disk (MO), and a magnetic disk. For example, when the magnetic disk is produced by using the substrate according to the present invention, an underlying layer such as Cr, Mo, Al, Ti, and Si, a magnetic layer such as Co—Pt, Co—Pd, Co—Cr—Pt, and Co—Ni—Cr, and a protective layer such as C and $SiO_2$ are successively formed on the substrate by means of sputtering or the like. Finally, a hydrocarbon or fluorocarbon lubricant, for example, Fomblin Z-DOL (trade name) is applied as a lubricating film by means of the spin coat method. The magnetic disk thus obtained is excellent in smoothness and flatness of the recording surface. Accordingly, it is possible to realize the near contact system, and it is possible to realize the high density recording operation and the reproducing operation with sufficient reproduction signal output. The magnetic disk of the present invention makes it possible that the glide height is not more than 40 nm. When the optical disk such as the magneto-optical disk, the compact disk, and the digital versatile disk is produced by using the substrate of the present invention, a reflective film is provided on the substrate depending on the type of the optical disk, or a phase-change recording film as a recording layer, a magneto-optical recording film, and a dye film or the like are provided together with a dielectric layer. Arbitrary known methods may be applied to the method for producing the optical disk and the magnetic disk.

DESCRIPTION OF THE PREFERRED EMBODIMENTS

Embodiments and Examples of the present invention will be explained in detail below with reference to the drawings. However, the present invention is not limited thereto.

Example 1

[Structure of Mold]

Figure 1:
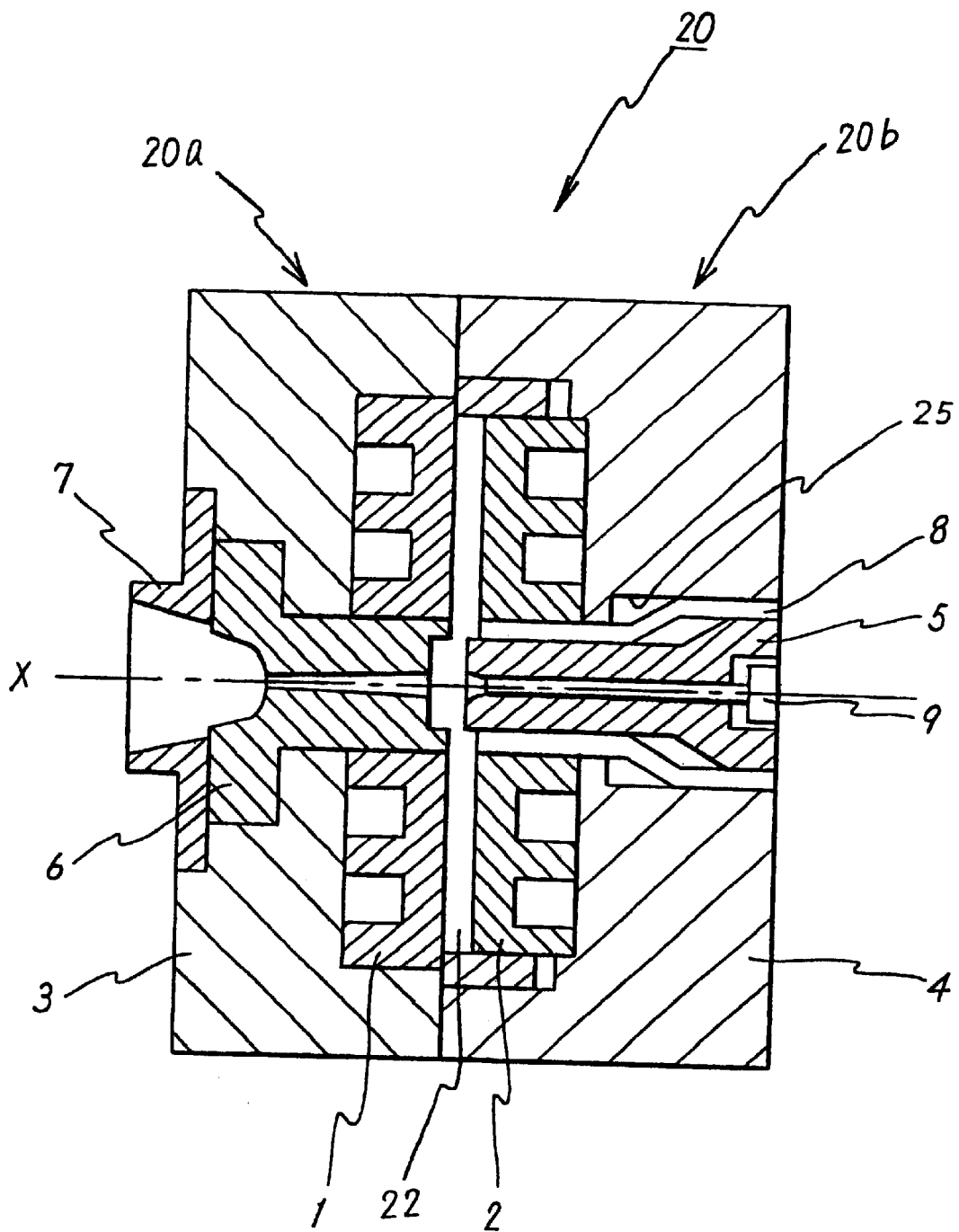
FIG. 1 shows a cross-sectional view illustrating an injection molding mold used in an embodiment of the present invention.
Figure 2:
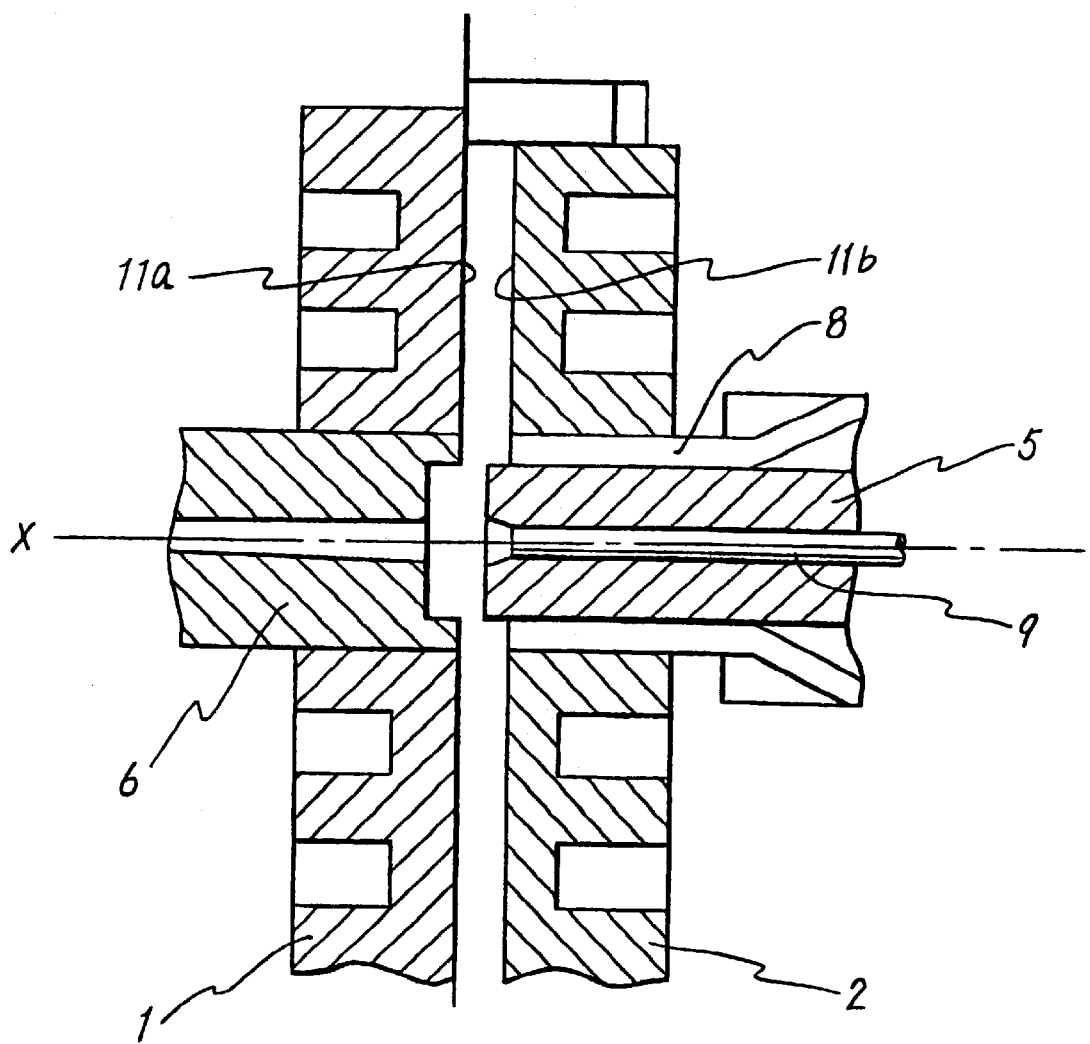
FIG. 2 shows a magnified cross-sectional view of a cavity section of the mold shown in FIG. 1.

FIG. 1 shows a cross-sectional structure of an injection molding mold 20 according to the present invention. FIG. 2 shows a magnified cross-sectional view of a cavity section of the mold 20 shown in FIG. 1. The mold 20 comprises a stationary mold 20a and a movable mold 20b which are combined along an identical axis (X axis). The stationary mold 20a comprises a stationary retainer plate 3, a spool bush 6 inserted along the central axis X, and a disk-shaped cavity surface-forming plate 1 for forming a cavity surface on the side of the stationary mold. The spool bush 6 is connected to a nozzle of a molding machine (not shown) for injecting a molten resin into the mold during injection molding.

The movable mold 20b comprises a movable retainer plate 4, an ejector pin 9 inserted along the central axis X, a gate cut punch 5 inserted along its outer circumference, an ejector sleeve 8 for ejecting the substrate, and a cavity surface-forming plate 2 for forming a cavity surface on the side of the movable mold. The ejector sleeve 8 is inserted movably in the direction of the central axis in a cylindrical cylinder 25 formed in the movable retainer plate 4. The movable mold 20b and the stationary mold 20a are supported by four rods (not shown) disposed in parallel to the central axis X when they are installed to the molding machine. The movable mold 20b is slidable on the rods in order to make movement in the direction of the central axis X. When the movable mold 20b and the stationary mold 20a are integrated into one unit as shown in the drawings, a cavity 22 is formed by the cavity surface-forming plates 1, 2 of them.

Both of the cavity surface-forming plate 1 of the stationary mold 20a and the cavity surface-forming plate 2 of the movable mold 20b of the mold 20 of this embodiment were produced by using a steel material of HIPM 38 produced by Hitachi Metals. Before the cavity surface-forming plates 1, 2 were incorporated into the stationary retainer plate 3 and the movable retainer plate 4 respectively, their surfaces 11a, 11b for forming the cavity surfaces were subjected to polishing for 30 minutes by using a polishing apparatus with fine particle diamond abrasive grains having an average grain diameter of not more than 1 µm. The surface roughness after the polishing was measured by using TOPO-2D·3D produced by WYKO. As a result, each of the surfaces resided in Ra=2.0 nm and Rmax=22 nm.

[Production of Substrate and Magnetic Disk]

The mold 20 shown in FIGS. 1 and 2 was installed to an injection molding machine, DISK 3 (not shown) produced by Sumitomo Heavy Industries to carry out injection molding for a magnetic disk substrate. At first, the mold temperature was adjusted to be 120° C., and the cylinder temperature was adjusted to be 340° C. Next, the nozzle of the molding machine was tightly attached to the spool bush. The stationary mold 20a and the movable mold 20b were clamped by means of a mold clamping mechanism (not shown) of the injection molding machine. A molten resin of norbornene type amorphous polyolefin (ZEONEX 280 produced by Nippon Zeon) was injected into the cavity 22 of the mold 20. After the cavity 22 was charged with the resin, the pressure was held for a certain period of time in order to supplement an amount corresponding to the volume contraction of the resin caused by cooling. Subsequently, the gate cut punch 5 was allowed to protrude toward the stationary mold 20a. The cavity surface-forming plate 2 on the movable side was separated from the resin to perform cooling. After the cooling, the ejector sleeve 8 was allowed to protrude, and the solidified disk substrate was released from the mold. Thus, the substrate composed of the norbornene type amorphous polyolefin resin was obtained, which had a diameter of 95 mm, a hole diameter of 25 mm, an d a thickness of 1.2 mm.

Figure 4:
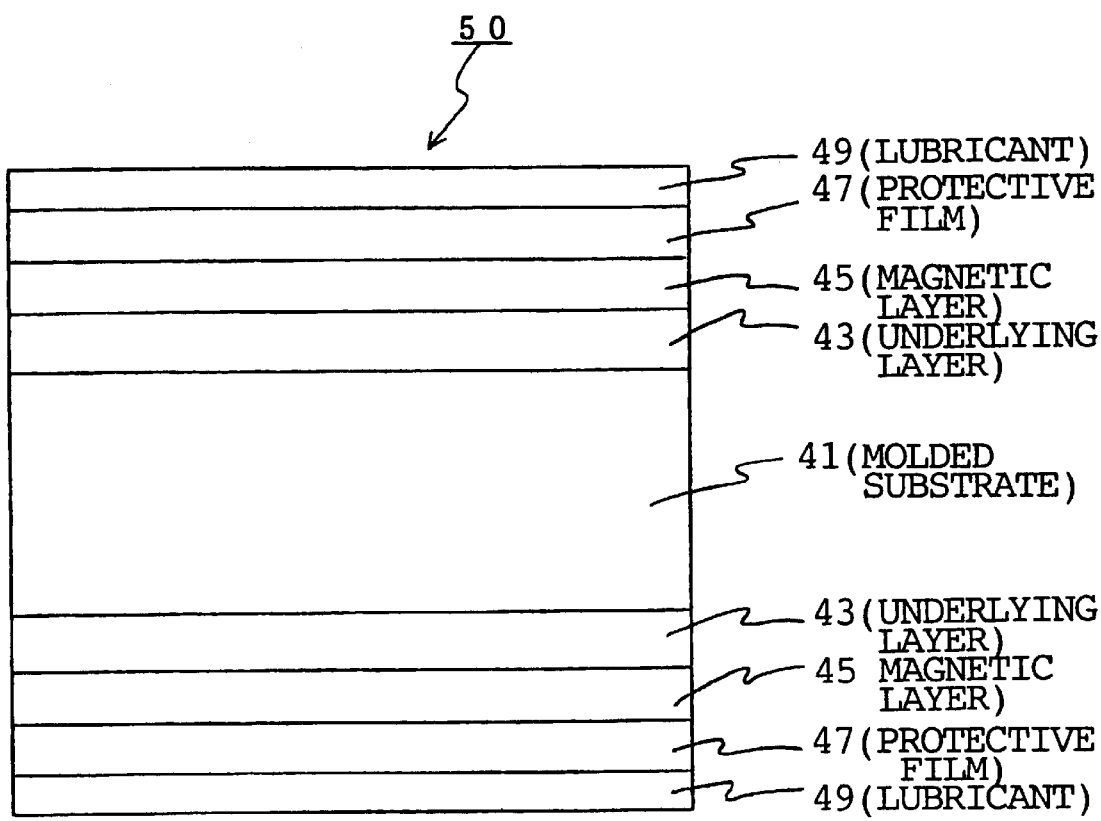
FIG. 4 shows a cross-sectional view of a magnetic disk produced in an embodiment of the present invention.

Next, as shown in FIG. 4, an underlying layer 43 composed of Cr having a film thickness of 50 nm, a magnetic layer 45 composed of Co—Cr—Pt having a film thickness of 20 nm, and a protective film 47 having a film thickness of 10 nm were successively formed on both surfaces of the obtained substrate 41 by means of sputtering. Further, a lubricant layer 49 composed of Fomblin Z-DOL (trade name) was applied onto the protective film 47 by using a spin coater to give a film thickness of 2 nm. Thus, the magnetic disk 50 was completed. The magnetic characteristic of the magnetic disk 50 thus obtained was measured. As a result, a good coercive force Hc of 120 KA/m was obtained for the both surfaces.

Example 2

In Example 1, the smooth surface of Ra=2.0 nm and Rmax=22 nm was obtained by polishing the surfaces 11a11b for forming the cavity surfaces. However, in this embodiment, the surfaces 11a, 11b for forming the cavity surfaces were polished with a grinding stone of #800 by using a polishing apparatus to give a degree of Rmax=100 nm. Subsequently, electroless Ni—P plating was applied to the surfaces 11a, 11b to give a thickness of 15 µm. The Ni—P plating surface was subjected to polishing for 30 minutes by using a polishing apparatus with fine particle diamond abrasive grains having an average grain diameter of not more than 1 82 m. The Ni—P plating surface after the polishing was measured by using TOPO-2D·3D produced by WYKO. As a result, any of the surfaces resided in Ra=1.3 nm and Rmax=12 nm.

The cavity surface-forming plates 1, 2 having been mirror-finished as described above were incorporated into the stationary retainer plate 3 and the movable retainer plate 4 respectively to assemble the mold. After that, the mold was installed to the injection molding machine, and the injection molding was performed with the norbornene type amorphous polyolefin resin to obtain a substrate, in the same manner as performed in Example 1. A magnetic disk was produced by using the obtained substrate in accordance with the same sputtering process as performed in Example 1.

Example 3

A substrate was produced by means of injection molding in accordance with the same operation as performed in Example 2 except that only the surface 11a of the cavity surface-forming plate 1 of the stationary mold was subjected to the plating and the polishing process as described Example 2. A magnetic disk was obtained by using the obtained substrate. The magnetic disk had a recording area only on one surface.

Example 4

A substrate was obtained by means of injection molding in the same manner as performed in Example 2 except that AD9000G polycarbonate resin produced by Teijin Chemical was used as a material for the substrate. A magnetic disk was produced by using the substrate.

Comparative Example 1

A substrate was obtained by means of injection molding in the same manner as performed in Example 1 except that a mold having surface roughness of Ra=3 nm and Rmax=30 nm was constructed by directly polishing the surfaces 11a, 11b for forming the cavity surfaces with diamond abrasive grains. A magnetic disk was produced by using the substrate.

Comparative Example 2

A substrate was obtained by means of injection molding in the same manner as performed in Example 2 except that the electroless Ni—P plating used in Example 2 was applied in a thickness of 1 μm to the surfaces 11a, 11b for forming the cavity surfaces. A magnetic disk was produced by using the substrate. The surfaces 11a, 11b for forming the cavity surfaces after the plating the polishing process had surface roughness of Ra=4 nm and Rmax=42 nm.

Comparative Example 3

Figure 3:
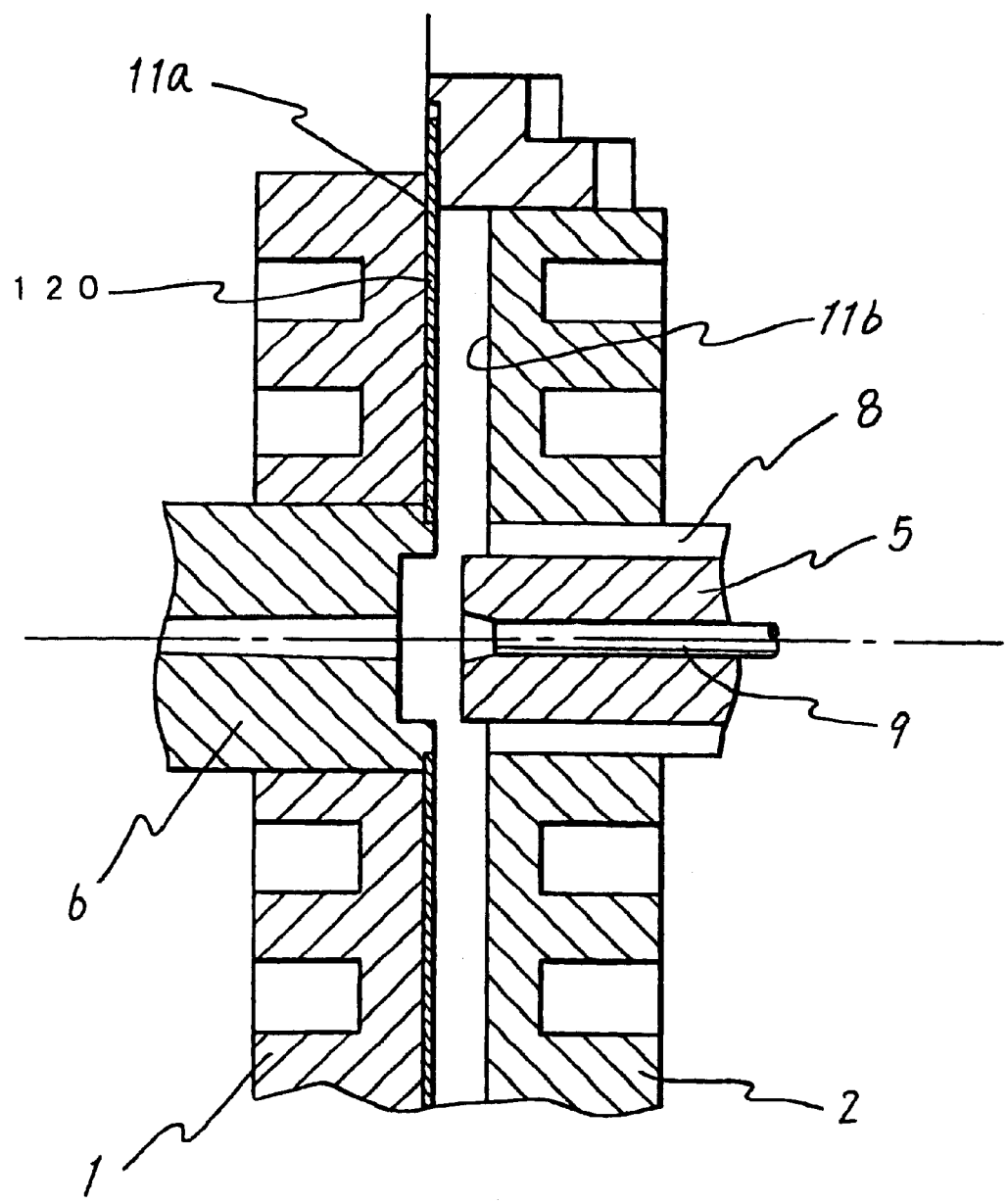
FIG. 3 shows a magnified cross-sectional view of a cavity section of a mold provided with a stamper used in Comparative Example 3.

A mold was assembled in the same manner as performed in Example 1 to obtain a magnetic disk except that the mold was assembled by installing a mirror-finished stamper 12 to the surface 11a of the cavity-forming plate 1 of the stationary mold 20a as shown in FIG. 3 without mirror-finishing the surfaces 11a, 11b for forming the cavity surfaces used in Example 1, by means of the polishing. The mirror-finished stamper 12 was produced by applying a positive resist onto a glass base plate, developing the resist exactly, and then allowing its surface to have conductivity by means of sputtering, followed by nickel electroforming. The stamper had a thickness of 300 μm and surface roughness of Ra=0.5 nm and Rmax=6 nm.

[Measurement of Height of Minute Waviness]

The height of minute waviness existing on the surface of the experimentally produced disk was measured by using a laser vibration meter. The measurement was performed as follows. That is, the disk was attached to a spin stand to measure the waviness velocity of the disk surface while rotating the disk. Low frequency portions, in which the waviness cycle was not less than 10 mm, were omitted. An obtained signal was integrated to determine the height of minute waviness. The cutoff frequency fc of the filter is determined by the measurement radius r (mm) and the number of rotation n (rps) in order to omit the waviness of not less than 10 mm, which is represented by the following expression.

$$fc = 2\pi rn/10 \tag{1}$$

The type of the filter resided in a quadratic Butterworth characteristic. Table 1 shows measurement results for the magnetic disks obtained in Examples 1 to 4 and Comparative Examples 1 to 3. It is understood that any of the magnetic disks obtained in Examples 1 to 4 had minute waviness of not more than 50 nm, and any of the magnetic disks obtained in Comparative Examples had minute waviness of not less than 50 nm.

[Measurement of Surface Roughness of Molded Substrate]

The surface roughness of the surface corresponding to the recording surface of the experimentally produced substrate for the magnetic disk was measured by using TOPO-2D·3D produced by WYKO. Results are shown in Table 1. According to Table 1, it is understood that the surface roughness, which is approximately equivalent to the surface roughness of the cavity surface-forming plate of the mold, was also obtained for the molded substrate in Examples 1 to 4. In Comparative Example 1, the surface roughness of the substrate was insufficient in the same manner as the surface roughness of the cavity surface-forming plate. In Comparative Example 2, it is considered that Rmax was large as a result of reflection of the irregularity of the surface subjected to the plating, to the plating surface, because the plating thickness was thin. In Comparative Example 3, the surface roughness of Ra=0.5 nm and Rmax=5 nm was obtained corresponding to the smoothness of the mirror-finished surface of the stamper.

TABLE 1

| Sample No. | Surface roughness of mirror-finished surface of mold cavity (nm) | | Surface roughness of molded substrate (nm) | | Glide height (nm) | Modulation (%) | Minute waviness (nm) |
| --- | --- | --- | --- | --- | --- | --- | --- |
| | Ra | Rmax | Ra | Rmax | | | |
| Example 1 | 2.0 | 22 | 2.0 | 22 | 40 | 6 | 35 |
| Example 2 | 1.3 | 12 | 1.3 | 11 | 30 | 6 | 25 |
| Example 3 | 1.3 | 12 | 1.3 | 11 | 30 | 5 | 20 |
| Example 4 | 1.3 | 12 | 1.3 | 10 | 35 | 5 | 20 |
| Com. Ex. 1 | 3.0 | 30 | 3.0 | 28 | 75 | 4 | 60 |

TABLE 1-continued

| Sample No. | Surface roughness of mirror-finished surface of mold cavity (nm) | | Surface roughness of molded substrate (nm) | | Glide height (nm) | Modulation (%) | Minute waviness (nm) |
| --- | --- | --- | --- | --- | --- | --- | --- |
| | Ra | Rmax | Ra | Rmax | | | |
| Com. Ex. 2 | 4.0 | 42 | 4.0 | 40 | 85 | 10 | 70 |
| Com. Ex. 3 | 0.5 | 6 | 0.5 | 5 | 30 | 25 | 80 |

[Evaluation of Recording and Reproduction Characteristics of Magnetic Disk]

In order to evaluate the characteristics of the magnetic disks obtained in Examples 1 to 4 and Comparative Examples 1 to 3, the variation (modulation) of the reproduction signal output and the floating height (glide height) of the magnetic head during rotation of the disk were measured respectively. As for the modulation, the variation of the reproduction output was observed, as obtained when a test pattern having been recorded at a recording density of 100 kFCl (Flux Changes per inch) was reproduced. As for the glide height, 50% slider was used. The floating amount of the magnetic head was gradually decreased. The impact sound, which was obtained upon collision of the magnetic head with the projections on the surface of the magnetic disk, was detected by using an AE element (Acoustic Emission element) attached to the arm of the magnetic head. The lower limit, until which no collision was caused, was regarded as the value of the glide height. Measurement results are shown in Table 1 respectively. Any of the magnetic disks obtained in Examples 1 to 4 had the glide height of not more than 40 nm and the modulation of not more than 6%. Therefore, it is understood that the magnetic disks of the present invention are preferably used for high density recording and reproduction therefrom.

Example 5
[Method for Forming Concave-convex Pattern on Cavity Surface]

Figure 5A:
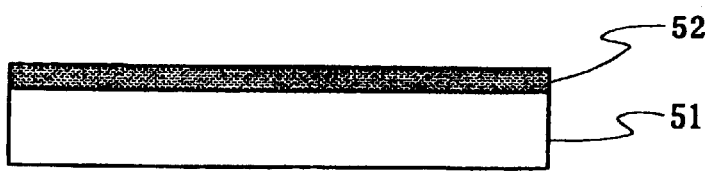
FIGS. 5A to 5I illustrate a process for forming a concave-convex pattern on a cavity surface of a mold used in Example 5 of the present invention.
Figure 5B:
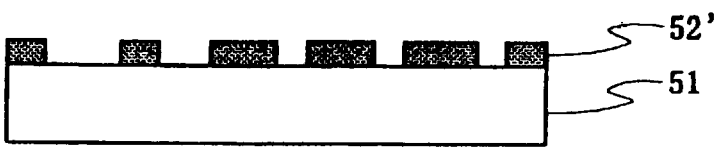
Figure 5C:
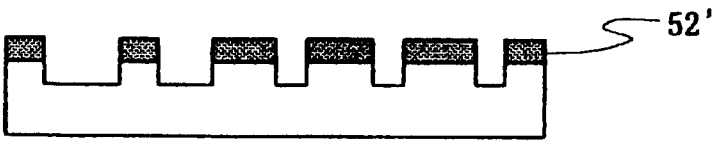
Figure 5D:
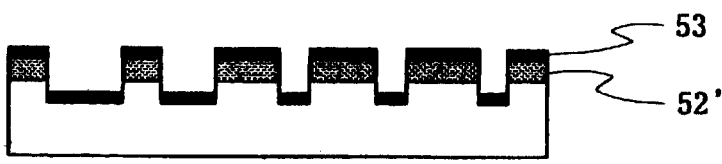
Figure 5E:
Figure 5F:
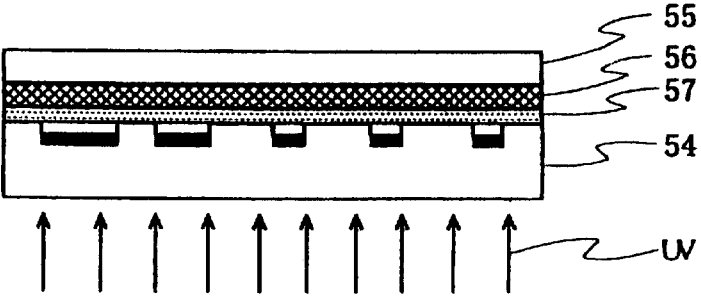
Figure 5G:
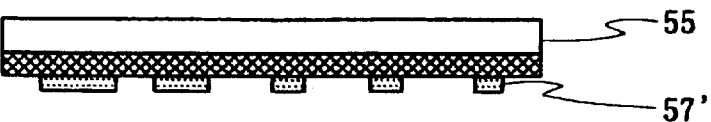
Figure 5H:
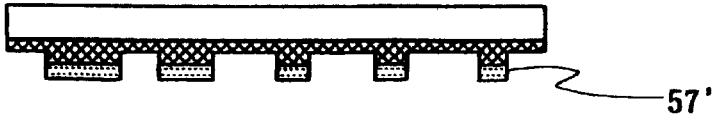
Figure 5I:
Figure 6:
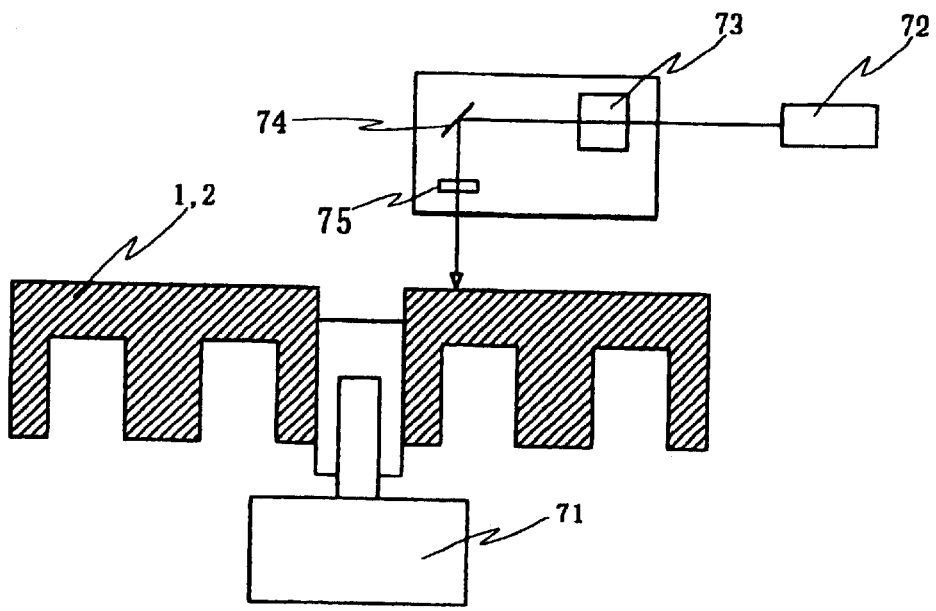
FIG. 6 illustrates an apparatus and a method for producing a texture zone for floating a magnetic head.
Figure 7:
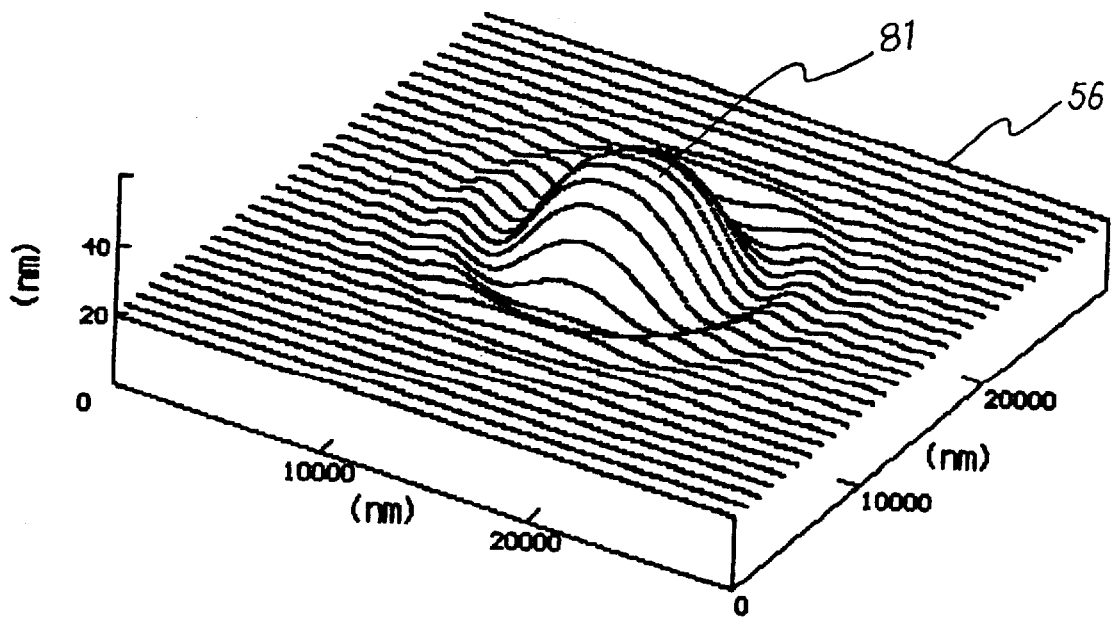
FIG. 7 conceptually illustrates a projection formed on Ni—P plating by using the apparatus and the method shown in FIG. 6.

With reference to FIGS. 5 to 7, explanation will be made for a method for forming a concave-convex pattern on the cavity surface-forming plate 1 of the stationary mold 20a and the cavity surface-forming plate 2 of the movable mold 20b. FIGS. 5A to 5E illustrate a method for producing a mask used to form such a concave-convex pattern by means of photolithography.

At first, as shown in FIG. 5A, a resist 52 is applied to a base plate 51, and then an ultraviolet laser beam is condensed to perform exposure so that a desired pattern is formed. Subsequently, development is performed as shown in FIG. 5B by using, for example, a developer liquid. Thus, the exposed portion is removed. The base plate 51 is subjected to etching by using a resist 52' as a mask. Thus, a pattern as shown in FIG. 5C can be formed. A material 53, which serves as a masking material, is vapor-deposited onto the base plate 51 by means of, for example, the sputtering method (FIG. 5D). The remaining resist 52' is removed by means of ashing based on the use of oxygen gas to produce a mask 54 (FIG. 5E).

Subsequently, as shown in FIG. 5F, a resist 57 is applied to a cavity surface 55 applied with the Ni—P plating 56 as described above and mirror-finished to give Ra=1.3 nm and Rmax=12 nm. The mask 54 is tightly contacted with the side of the mirror-finished Ni—P plating 56 of the cavity surface 55 in an arrangement as shown in FIG. 5F, followed by being irradiated with ultraviolet light (UV). The cavity surface 55 is subjected to development to obtain a pattern as shown in FIG. 5G. Further, as shown in FIG. 5H, the remaining resist 57' is used as a mask to apply etching. Thus, the surface of the Ni—P plating 56 is removed so that the depth of the pattern is approximately equal to the concave-convex depth to be obtained upon completion of the substrate. Finally, the remaining resist 57' is removed by means of ashing with oxygen gas. The depth of the concave-convex pattern thus obtained is appropriately 20 nm to 40 nm in the case of the texture zone for floating the magnetic head, while it is appropriately 80 nm to 200 nm in the case of the servo pattern. When several patterns having different depths are formed on an identical cavity surface, the cavity may be subjected to etching while preparing masks for each of the depths. According to this method, it is possible to prepare a plurality of cavities by using one mask.

Figure 8A:
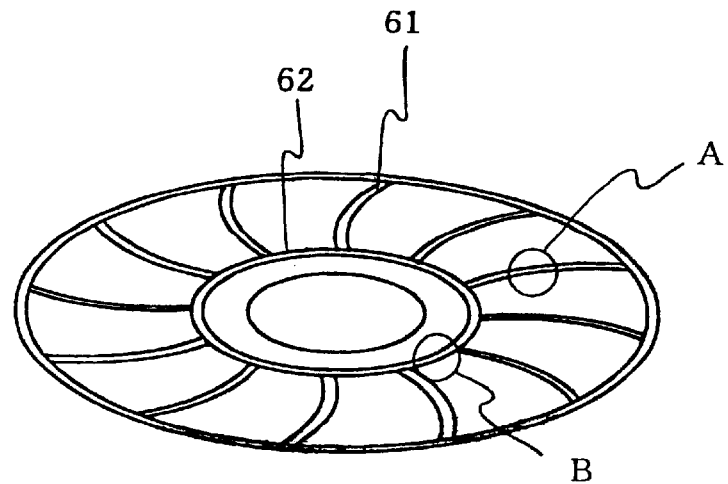
FIG. 8A conceptually illustrates a structure of a substrate obtained in an embodiment of the present invention, and FIGS. 8B and 8C conceptually show magnified views of areas A and B shown in FIG. 8A.
Figure 8B:
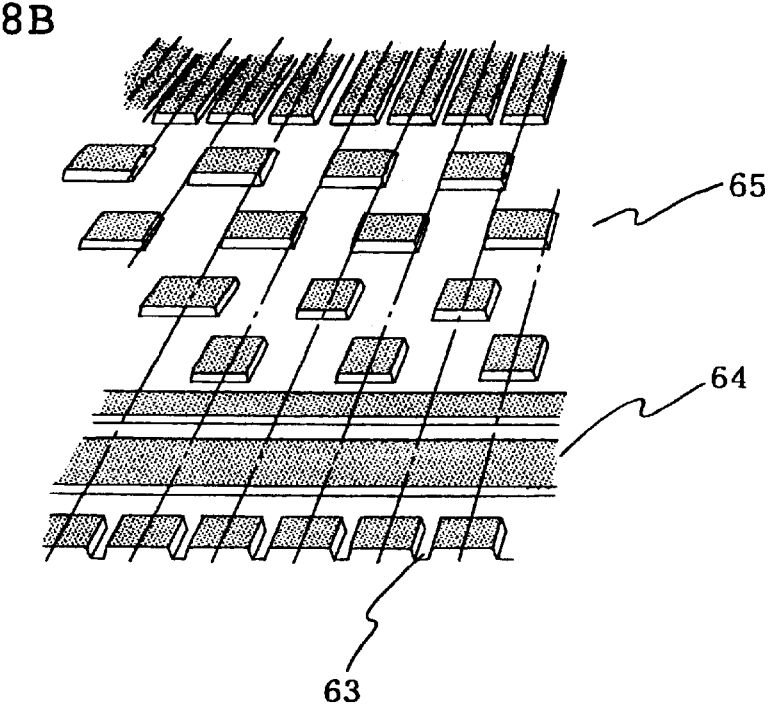
Figure 8C:
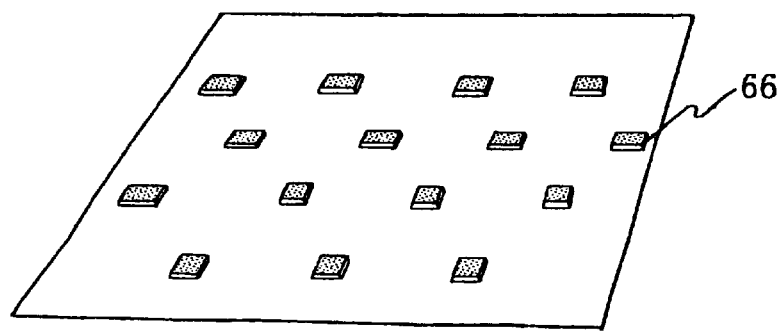

FIGS. 8A to 8C illustrate an example of the substrate pattern subjected to the injection molding by using the mold having the cavity surface 55 formed with the concave-convex pattern as described above. As shown in FIG. 8A, the texture zone 62 for floating the magnetic head is formed at the inner circumferential portion of the disk, and the servo pattern 61 is formed at the recording and reproduction area. FIGS. 8B and 8C show a magnified view in the vicinity of an area A including the servo pattern shown in FIG. 8A and a magnified view in the vicinity of an area B including the texture zone 62 respectively. When the disk is stopped, the projections substantially contact with the magnetic head at the texture zone 62. Therefore, the area of the projections is desirably about 0.2% to 5%. In this embodiment, the area is 0.5%, and the depth is 30 nm.

As shown in FIG. 8B, the servo pattern 61 comprises clock marks 64 and servo marks 65, and it is formed in conformity with the movement locus of the magnetic head. In this embodiment, the depth of the marks is 100 nm. FIG. 8C shows a texture pattern formed with a plurality of dots 66. The substrate may possess the pattern shown in FIGS. 8B and 8C on both surfaces of the substrate. A Cr underlying layer, a Co—Cr—Pt magnetic layer, a carbon protective film, and a lubricant layer may be stacked by means of sputtering on the both surfaces of the substrate with the concave-convex pattern obtained as described above to produce a magnetic disk, in the same manner as the magnetic disk shown in FIG. 4.

The texture zone for starting the operation of the floating type head can be also formed by using an apparatus and a method as shown in FIG. 6. In this apparatus, a pulse beam radiated from a carbon dioxide-YAG laser 72 is shaped by using a beam-shaping prism 73. The beam diameter is converged by means of a converging lens 75 to radiate the beam onto the Ni—P plating on the cavity surface-forming plate 1 (and 2). The cavity surface-forming plate 1 is rotated by a driving motor 71. In this embodiment, a pulse beam having an intensity of 200 mW is radiated onto the Ni—P plating on the cavity surface-forming plate 1, 2 by using the carbon dioxide-YAG laser, while rotating, at 1800 rpm, the cavity surface-forming plate 1 having been mirror-finished to give Ra=1.3 nm and Rmax=12 nm. The Ni—P plating on the cavity surface is melted by means of the radiation of the pulse beam, making it possible to form a conical bump 81 as shown in FIG. 7. The projection of the bump 81 has a height of about 30 nm.

Example 6

Figure 12A:
FIGS. 12A to 12G illustrate a process for forming a concave-convex pattern on a cavity surface of a mold used in Example 6.
Figure 12B:
Figure 12C:
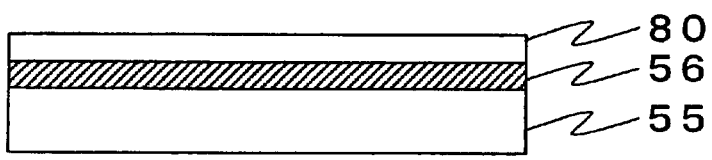
Figure 12D:
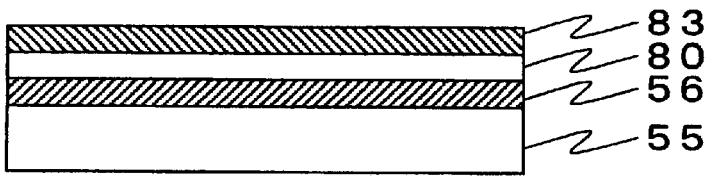
Figure 12E:
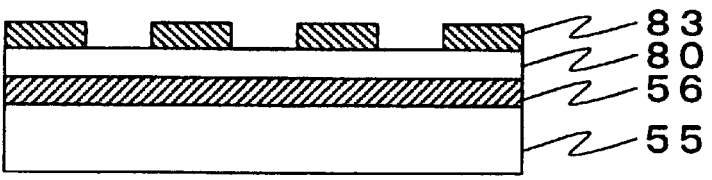
Figure 12F:
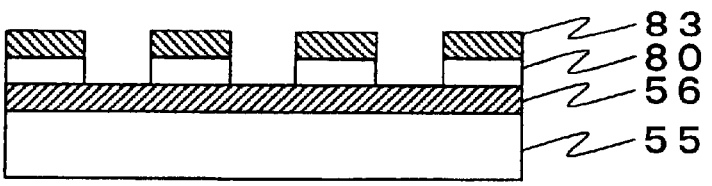

In Example 5, the Ni—P plating was formed on the cavity surface, and the surface of the Ni—P plating was processed by means of the photolithography in accordance with the predetermined pattern to provide the recesses. In this embodiment, explanation will be made for a method for providing projections by stacking a metal such as Ti and Ta on the Ni—P plating surface. As shown in FIGS. 12A and 12B, an Ni—P plating 56 is formed on a cavity surface 55. The Ni—P plating 56 is mirror-finished to give Ra=1.3 nm and Rmax=12 nm. After that, as shown in FIG. 12C, a metal layer 80 composed of Ti, Ta, Al, or an alloy containing these elements is deposited by means of a vacuum deposition method such as the sputtering method, in an amount corresponding to the depth of a concave-convex pattern (pit pattern to be formed). A photoresist 83 is applied as shown in FIG. 12D. The photoresist 83 is irradiated with an ultraviolet laser beam to perform exposure so that a desired pattern is obtained, followed by development (FIG. 12E). Subsequently, as shown in FIG. 12F, exposure is performed with respect to $CF_2Cl_2$ and Ar gas in RF plasma so that Ti, Ta, Al, or the alloy containing these elements corresponding to the portion not masked by the resist 83 is subjected to reactive etching. Finally, the resist 83 is removed in oxygen gas in accordance with the plasma ashing method to obtain a projection pattern of the metal layer 80 on Ni—P.

Figure 12G:
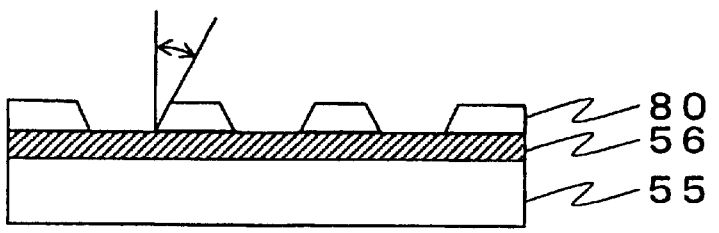

Those usable as the reaction gas include gases such as $BCl_3$, $CHCl_3$, and $CF_2Cl_2$. In this method, the reaction velocity of the metal layer 80 with respect to the gas such as $BCl_3$, $CHCl_3$, and $CF_2Cl_2$ is faster than the reaction velocity with respect to the resist 83. Therefore, a sharp pattern edge can be formed. Further, the reaction velocity of the metal layer 80 is faster than the reaction velocity of Ni—P. Therefore, the depth of the pattern can be controlled and determined by the thickness of the vapor-deposited film of the metal layer, i.e., Ti, Ta, Al, or the alloy containing these elements. Accordingly, it is possible to form a uniform pattern. The resist is subjected to etching by mixing $O_2$ gas with the gas $BCl_3$, $CHCl_3$, or $CF_2Cl_2$ during the etching. The angle of the pattern edge can be controlled as shown in FIG. 12G. Further, in the method of this embodiment, the metal layer having a thickness of about 100 nm is deposited on the Ni—P surface having predetermined flatness. Therefore, the surface of the metal layer is also capable of having flatness to which the flatness of the Ni—P surface is reflected. Thus, it is possible to avoid head crash.

Example 7

Figure 9A:
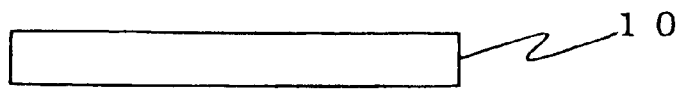
FIGS. 9A to 9E schematically illustrate production steps for a stamper having a two-layered structure in accordance with the present invention.
Figure 9B:
Figure 9C:
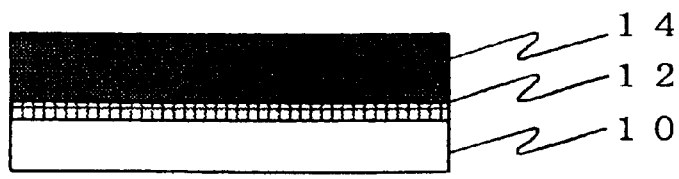

A method for producing a stamper having the two-layered structure according to the present invention will be explained with reference to FIGS. 9A–9E. A glass base plate 80 having a diameter of 20 cm was prepared (FIG. 9A). An Ni electrode layer 12 was formed as a film to give a film thickness of 50 nm by means of the sputtering method (FIG. 9B). Subsequently, the glass base plate formed with the Ni electrode layer was arranged in a first plating bath having a bath composition prepared as shown in Table 2 to make adjustment so that the glass base plate served as a cathode. An Ni—P film 14 was formed by electroplating to give a film thickness of 200 μm on the Ni electrode layer 12 under an electrolysis condition shown in Table 2 in accordance with the electroplating method (FIG. 9C).

TABLE 2

| | |
|---|---|
| Ni sulfamate | 1.280 mol/l |
| Phosphorous acid | 0.256 mol/l |
| Boric acid | 0.485 mol/l |
| Bath temperature | 50° C. |
| Bath pH | 1.98 |
| Counter electrode | Pt |
| Number of substrate rotation | 150 rpm |
| Plating current density | 5 A/dm² |
| Cathode/counter electrode distance | 3 cm |

TABLE 3

| | |
|---|---|
| Ni sulfamate | 1.280 mol/l |
| Boric acid | 0.485 mol/l |
| Bath temperature | 50° C. |
| Bath pH | 4.00 |
| Counter electrode | Pt |
| Number of substrate rotation | 150 rpm |
| Plating current density | 5 A/dm² |
| Cathode/counter electrode distance | 3 cm |

Figure 9D:
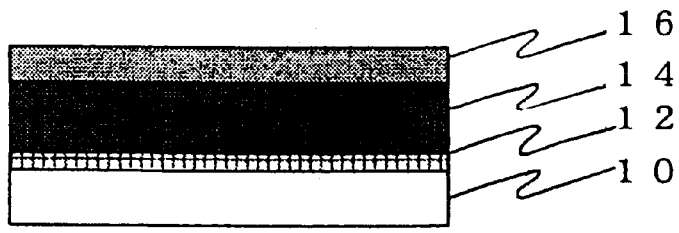
Figure 9E:

Subsequently, the glass base plate formed with the Ni—P film 14 was taken out of the first plating bath, followed by washing with pure water. After that, the glass base plate was transferred to a second plating bath having a bath composition as shown in Table 3. A pure Ni film 16 was formed by electroplating to give a film thickness of 100 μm on the Ni—P film 14 under an electrolysis condition shown in Table 3 in accordance with the electroplating method (FIG. 9D). The laminate composed of the Ni—P film and the pure Ni film formed on the Ni electrode was peeled off from the Ni electrode film. Thus, the stamper having the two-layered structure composed of the Ni—P film and the pure Ni film was obtained (FIG. 9E).

Example 8

A stamper having the two-layered structure was produced in the same manner as Example 7 except that the first plating bath was prepared to have a bath composition as shown in Table 4, and an Ni—B film was formed by electroplating under an electrolysis condition as shown in Table 4 in place of the Ni—P film 14. Thus, the stamper having the two-layered structure composed of the Ni—B film and the pure Ni film was obtained.

TABLE 4

| | |
|---|---|
| Ni sulfamate | 1.280 mol/l |
| Dimethylammineborane | 0.500 mol/l |
| Boric acid | 0.485 mol/l |
| Bath temperature | 50° C. |
| Bath pH | 7.00 |
| Counter electrode | Pt |
| Number of substrate rotation | 150 rpm |
| Plating current density | 5 A/dm² |
| Cathode/counter electrode distance | 3 cm |

TABLE 5

| | |
|---|---|
| Ni sulfamate | 1.280 mol/l |
| Co sulfamate | 0.150 mol/l |
| Boric acid | 0.485 mol/l |
| Bath temperature | 50° C. |
| Bath pH | 4.5 |
| Counter electrode | Pt |
| Number of substrate rotation | 150 rpm |
| Plating current density | 5 A/dm$^2$ |
| Cathode/counter electrode distance | 3 cm |

TABLE 6

| | |
|---|---|
| Co nitrate | 1.280 mol/l |
| Ag nitrate | 0.100 mol/l |
| Boric acid | 0.485 mol/l |
| Bath temperature | 50° C. |
| Bath pH | 4.5 |
| Counter electrode | Pt |
| Number of substrate rotation | 150 rpm |
| Plating current density | 5 A/dm$^2$ |
| Cathode/counter electrode distance | 3 cm |

Example 9

A stamper having the two-layered structure was produced in the same manner as Example 7 except that the first plating bath was prepared to have a bath composition as shown in Table 5, and a Co—Ni film was formed by electroplating under an electrolysis condition as shown in Table 5 in place of the Ni—P film. Thus, the stamper having the two-layered structure composed of the Co—Ni film and the pure Ni film was obtained.

Example 10

A stamper having the two-layered structure was produced in the same manner as Example 7 except that the first plating bath was prepared to have a bath composition as shown in Table 6, and a Co—Ag film was formed by electroplating under an electrolysis condition as shown in Table 6 in place of the Ni—P film. Thus, the stamper having the two-layered structure composed of the Co—Ag film and the pure Ni film was obtained.

[Vickers Hardness]

The Vickers hardness was measured for the front surface and the back surface of the stamper having the two-layered structure prepared in Examples 7 to 10 under a condition of a load of 25 g respectively. Subsequently, the heights of the waviness existing on the surfaces of the respective stampers were measured by using a laser vibration meter. When the height of waviness was measured, the stamper was attached to a spin stand to perform the measurement while rotating the stamper. The low frequency portion, in which the cycle of waviness was not less than 10 mm, was omitted. Table 6 summarizes and illustrates results of the measurement of the Vickers hardnesses of the front surface and back surface and the height of waviness of the stamper having the two-layered structure prepared in Examples 7 to 10. Of the layers for forming the stamper, the front surface layer was the layer plated with the first plating bath (Ni—P film, Ni—B film, Co—Ni film, and Co—Ag film), and the back surface layer was the layer plated with the second plating bath (pure Ni film). As understood from the table, the Vickers hardness was not less than 500 Hv for all of the front surface layers of the stampers prepared in Examples 1 to 4, and the Vickers hardness was not more than 300 Hv for all of the back surface layers. The height of waviness having the cycle of not more than 10 mm was less than 50 nm for all cases.

TABLE 7

| Sample | Hardness of stamper front surface layer (Hv) | Hardness of stamper back surface layer (Ni) (Hv) | Height of waviness (nm) |
|---|---|---|---|
| Example 7 | 550 (Ni—P) | 250 | 5 |
| Example 8 | 800 (Ni—B) | 240 | 4 |
| Example 9 | 600 (Co—Ni) | 260 | 6 |
| Example 10 | 850 (Co—Ag) | 250 | 5 |

TABLE 8

| Sample | Stamper used | Height of waviness (nm) |
|---|---|---|
| Example 11 | Example 7 | 6 |
| Example 12 | Example 8 | 5 |
| Example 13 | Example 9 | 6 |
| Example 14 | Example 10 | 5 |
| Com. Ex. 4 | Com. Ex. 4 | 70 |

TABLE 9

| Sample | Thickness of Ni—P film (μm) | Thickness of pure Ni film (μm) | Ratio of thickness of Ni—P film to thickness of entire stamper | Height of waviness (nm) |
|---|---|---|---|---|
| Sample 1 | 50 | 250 | 0.17 | 60 |
| Sample 2 | 100 | 200 | 0.33 | 30 |
| Sample 3 | 150 | 150 | 0.50 | 15 |
| Sample 4 | 200 | 100 | 0.67 | 6 |
| Sample 5 | 250 | 50 | 0.83 | 6 |
| Sample 6 | 300 | 0 | 1.00 | 6 |

Examples 11 to 14

Plastic substrates were produced in accordance with the following method by using the stampers produced in Examples 7 to 10 respectively. At first, two stampers were prepared for each sample. The two stampers were installed to the stationary side and the movable side of the injection molding mold so that the back surface layer of the stamper was attached to the mold, in other words, the front surface layer of the stamper defined the cavity of the mold. Subsequently, a molten resin composed of norbornene type amorphous polyolefin was injected and charged into the mold, and the plastic substrate was injection-molded. During this process, the final resin-molding pressure was set to be 500 kg/cm$^2$. The height of the substrate surface waviness was measured for the respective plastic substrates thus obtained, in accordance with the same method as the method for measuring the height of waviness described above. Results are summarized and shown in Table 8.

As understood from Table 8, the height of waviness having the cycle of not more than 10 mm existing on the surface of the plastic substrates injection-molded by using the stampers prepared in Examples 7 to 10 was less than 50 nm. According to this fact, it is considered that the stampers prepared in Examples 1 to 4 scarcely underwent elastic deformation even when they are pressurized at the pressure of about 500 kg/cm$^2$ exerted by the molten resin during the injection-molding process.

Comparative Example 4

Two stampers having a single-layered structure were produced in accordance with the same method as that used in Example 7 except that the pure Ni film was prepared to have a film thickness of 300 μm without providing the Ni—P film. Subsequently, a plastic substrate was injection-molded in the same manner as performed in Example 11, and the height of waviness was measured for the obtained plastic substrate. As a result of the measurement, the height of waviness having the cycle of not more than 10 mm was 70 nm. According to this fact, it is considered that the elastic deformation was caused by the pressure of about 500 kg/cm$^2$ exerted by the molten resin during the injection-molding process, in the case of the stamper composed of pure Ni having the single-layered structure with the low Vickers hardness.

[Measurement of Change in Height of Waviness Depending on Change in Thickness of Hard Ni—P Film]

Stampers were produced in the same manner as used in Example 7 except that the film thicknesses of the respective layers of the two-layered structure, i.e. Ni—P/pure Ni as described in Example 7 were changed to 50 μm/250 μm, 100 μm/200 μm, 150 μm/150 μm, 200 μm/100 μm, 250 μm/50 μm, and 300 μm/0 μm respectively. Subsequently, plastic substrates were produced by injection molding by using the stampers prepared to have the foregoing thicknesses respectively, in the same manner as performed in Example 11. The height of waviness was measured for the obtained respective plastic substrates. Obtained results are shown in Table 9. The ratio of the thickness of the Ni—P film to the thickness of the entire stamper is simultaneously shown in Table 9.

As understood from Table 9, the height of waviness having the cycle of not more than 10 mm was successfully further suppressed to be low by allowing the ratio of the thickness of the Ni—P film to the thickness of the entire stamper to be not less than 0.5. Further, the elastic deformation of the stamper was successfully further decreased. When the injection-molding process was performed 1000 times, scuffing appeared on the back surface of the stamper in the case of only the stamper concerning Sample 6, as a result of increase in number of times of the injection-molding process. Further, scratches appeared on the surface of the mold to which the stamper was installed. This is probably because of the following reason. That is, the pure Ni layer having the low Vickers hardness was not formed on the side of the stamper concerning Sample 6 to be installed to the mold. According to this fact, it is considered that the pure Ni layer having the low Vickers hardness, which is provided on the side to be installed to the mold, has an effect to avoid scuffing of the stamper.

Example 15

Two stampers having the two-layered structure were produced in the same manner as performed in Example 7 except that a glass base plate was used, which was formed with a preformat pattern including, for example, a discrete groove, a servo mark, a clock mark, and an address pit. The preformat pattern was transferred in a concave-convex configuration onto the surface layer (Ni—P film) of the stamper. The glass base plate, on which the preformat pattern was formed, was previously produced in accordance with the following method. At first, a resist was applied onto the glass base plate to give a film thickness of 70 nm by means of the spin coating method. Subsequently, the resist was subjected to exposure in conformity with the preformat pattern including, for example, the discrete groove, the servo mark, the clock mark, and the address pit, by exposing the resist with a predetermined pattern by using a laser cutting machine based on the use of a light source of a laser beam having a wavelength of 458 nm. The glass base plate with the resist having been subjected to the exposure was developed by using an etching liquid. Thus, the glass base plate was obtained, on which the preformat pattern described above was formed in the concave-convex configuration.

The two stampers formed with the preformat pattern were installed to the stationary side and the movable side of the injection molding mold so that the surface layers (Ni—P films) of the stampers defined the cavity surfaces of the mold respectively. A molten resin composed of norbornene type amorphous polyolefin was injected and charged into the mold, and the plastic substrate was molded. During this process, the final resin-molding pressure was set to be 500 kg/cm$^2$. The height of the substrate surface waviness was measured for the plastic substrate obtained as described above, in accordance with the same method as the method for measuring the height of waviness described above. As a result, the height of waviness having the cycle of not more than 10 mm existing on the plastic substrate surface was 6 nm. According to this fact, it is considered that the stampers provided with the preformat pattern prepared in this embodiment scarcely underwent elastic deformation even when they are pressurized at the pressure of about 500 kg/cm$^2$ exerted by the molten resin during the injection and charging process.

Figure 10:
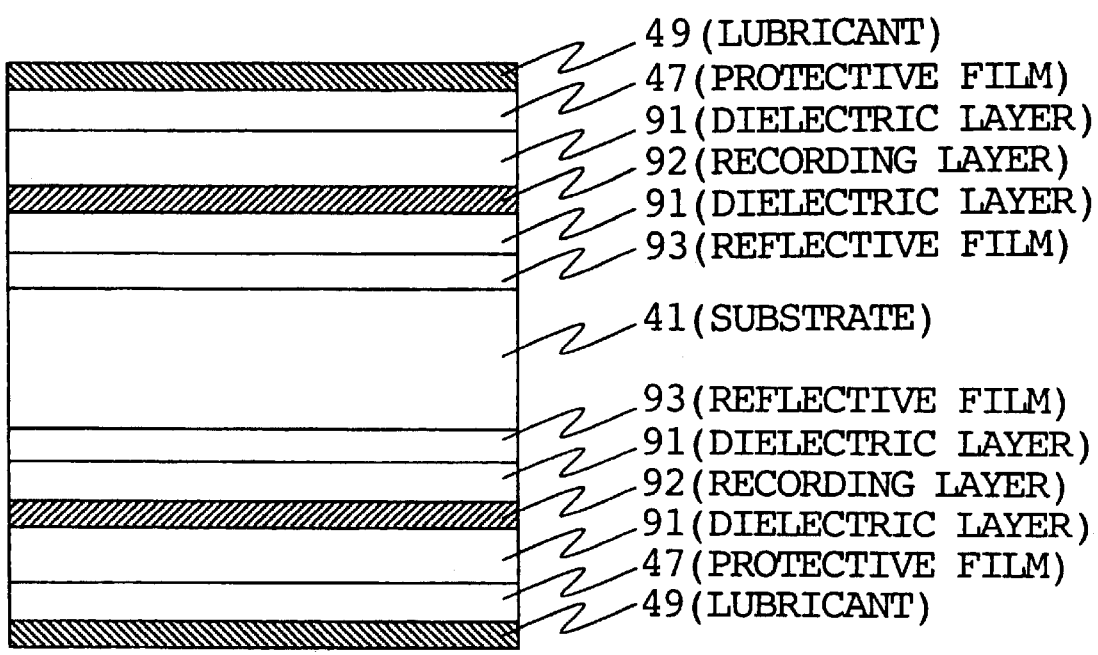
FIG. 10 shows a cross-sectional view illustrating a magneto-optical disk produced by using a substrate produced in an embodiment of the present invention.

The substrates composed of the polyolefin resin produced in Examples 11 to 14 are preferably used as a substrate for realizing a low cost hard disk. The substrate composed of the polyolefin resin produced in Example 15 is preferably used for DVD (digital versatile disk) for realizing high density recording and for a substrate for a hard disk of the emboss type as well as for a magneto-optical recording medium having magneto-optical recording films on both sides of the substrate. FIG. 10 shows a cross-sectional structure of a magneto-optical disk to which the substrates produced in Examples are applicable. The magneto-optical disk comprises a reflective layer 93, a dielectric layer 91, a recording layer 92 (magneto-optical recording layer), and a dielectric layer 92 which are stacked on upper and lower surfaces of the substrate 41 respectively. A protective film 47 composed of carbon may be formed on the surfaces of the dielectric layers 91 respectively. Further, formation of lubricant layers 49 as shown in FIG. 10 respectively makes it possible to improve the sliding characteristic of the head. Such an arrangement composed of the stacked layers makes it possible to perform recording and reproduction by using an apparatus incorporated with a floating head and a lens, for example, a solid immersion lens. The minute waviness is suppressed on the substrate according to the embodiments of the present invention. Therefore, the variation in floating amount is suppressed, and the variation in output can be made to be within 5%. Similarly, DVD for performing phase-change recording can be produced by using the substrate according to the present invention.

Example 16

Figure 11:
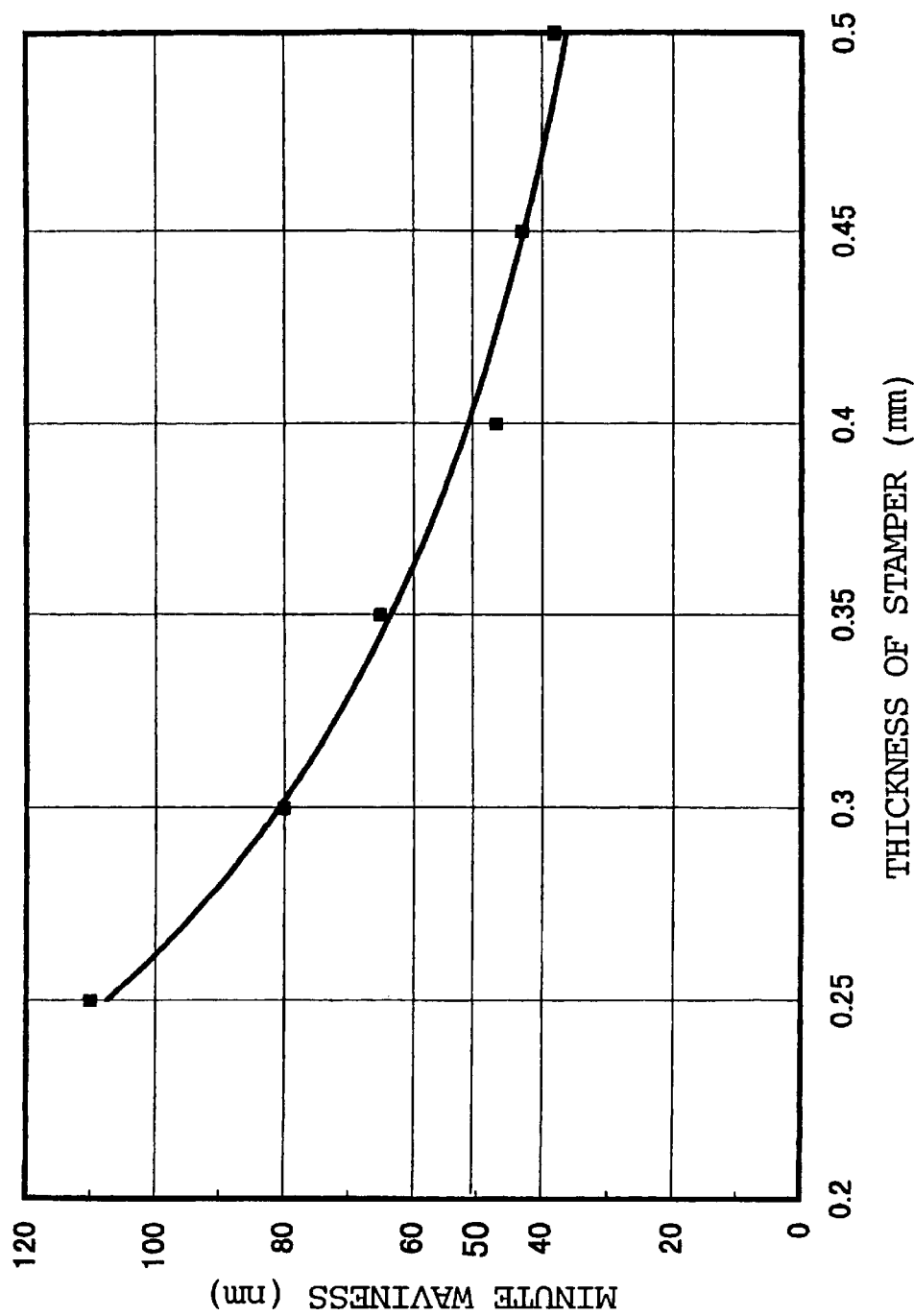
FIG. 11 shows a relationship between the thickness and the minute waviness of a stamper produced in an embodiment of the present invention.

Six stampers having the single-layered structure composed of Ni were produced by using the same method as used in Example 7 except that the Ni—P film was not provided, in which the stamper thickness was adjusted to be 0.25 mm, 0.3 mm, 0.35 mm, 0.4 mm, 0.45 mm, and 0.50 mm respectively. Any of the stampers had a Vickers hardness of 300 Hv at the portion to make contact with the molten resin. Subsequently, plastic substrates were produced by injection molding in the same manner as performed in Example 11. The height of waviness was measured for the obtained plastic substrates. Results of the measurement are depicted in a graph shown in FIG. 11. It was revealed that when the stamper thickness was not less than 0.4 mm, the height of minute waviness having the cycle of not more than 10 mm was less than 50 nm.

Example 17

The stamper having the thickness of 0.25 mm produced in Example 16 was subjected to sputtering with Ag on a side opposite to the transfer surface. After that, an Ni plate of 0.25 mm was glued thereto by being heated at 300° C. to produce a composite stamper. The Vickers hardness of the portion of the stamper to make contact with the molten resin was 300 Hv. Subsequently, a plastic substrate was produced by injection molding in the same manner as produced in Example 11. The height of waviness was measured for the obtained plastic substrate. As a result, the height of minute waviness having the cycle of not more than 10 mm was 40 nm.

The present invention has been explained above especially specifically with reference to Examples. However, the present invention is not limited thereto. The present invention includes alterations and modifications thereof which are easily conceivable by those skilled in the art. For example, in the embodiments described above, those used to apply the mirror-finishing processing are the polishing alone or the combination of plating and polishing. However, it is allowable to realize the surface roughness of Ra≦2.0 nm and Rmax≦22 nm by using a treatment other than the polishing, for example, by using lapping, plating alone, or a combination of plating and another surface treatment.

The present invention has been explained as exemplified by the production of the magnetic disk substrate and the magnetic disk based on the use thereof. However, the present invention is applicable to not only the magnetic disk substrate but also substrates for optical disks including read-only optical disks such as CD and DVD-ROM, write-once optical disks such as CD-R, minidisks, and rewritable disks such as magneto-optical disks. In the case of such application, the production is performed by using an injection molding mold for producing optical disk substrates, installed with a stamper previously formed with a preformat pattern having a concave-convex configuration. The mold according to the present invention can be produced by performing the polishing treatment as performed in Example 1 for the cavity surface opposing to the surface to which the stamper is installed, or by performing the polishing treatment after applying the plating as performed in Example 2. The substrate for the optical disk can be produced by installing such a mold to the injection molding machine so that a plastic is injection-molded. The resin surface of the obtained substrate on the side for forming the laser beam-introducing surface extremely scarcely suffers from defects such as pin holes. Thus, the error rate is decreased for the optical disk produced by using the substrate.

The steel material and the plating material for forming the cavity surface of the mold of the present invention are not limited to those disclosed in the embodiments and this specification. It is possible to use various materials therefor. It is needless to say that arbitrary materials can be used for the resin material for constructing the information-recording disk substrate and the materials for constructing the magnetic layer (magneto-optical layer) and the protective layer of the information-recording disk.

The portion of the stamper of the present invention to make contact with the molten resin is formed of the material having the Vickers hardness of not less than 500 Hv. Therefore, the elastic deformation is avoided even when the stamper is pressurized at the pressure of about 500 kg/cm² at the maximum exerted by the molten resin during the injection molding. Accordingly, the surface of the plastic substrate injection-molded by using the stamper of the present invention is extremely flat. For example, as for the waviness having the cycle of not more than 10 mm existing on the surface of the plastic substrate, the height of the waviness is suppressed to be less than 50 nm. Therefore, when the information-recording medium is produced by stacking, for example, the magnetic film on the plastic substrate with the height of waviness of the cycle of not more than 10 mm suppressed to be less than 50 nm, the surface of the obtained information-recording medium also has the extremely excellent flatness in the same manner as the plastic substrate. Accordingly, when information is recorded and reproduced on the information-recording medium by using the floating type head having the small floating amount, the information can be recorded and reproduced in a well-suited manner without causing any head crash. Thus, the variation in amplitude of the reproduction signal and the occurrence of tracking error, which would be otherwise caused by the waviness, are also avoided.

In the mold of the present invention, the surface roughness of the cavity surface for forming the recording surface of the information-recording disk resides in Ra≦2.0 nm and Rmax≦22 nm. Thus, the information-recording disk substrate molded by using the mold is allowed to possess the surface roughness equivalent to the surface roughness of the mold. Accordingly, the modulation and the glide height are extremely small in the case of the magnetic disk produced by using the substrate molded with the mold. Therefore, such a magnetic disk is most appropriate to be used for the magnetic disk for high density recording. The mold of the present invention can be produced by utilizing the injection molding mold to be used for producing ordinary substrates for optical disks. The mold of the present invention can be installed to the injection molding machine to be used for producing substrates for optical disks. Therefore, it is unnecessary to construct any new production equipment. Further, the mold of the present invention is based on the use of the technique as the means for super mirror-finishing the cavity surface, in which the metal plating is applied on the mirror-finished surface, and the surface of the plating is subjected to lapping or polishing by using the grinding abrasive grains. Therefore, it is possible to obtain the super mirror-finished surface extremely easily. Furthermore, it is unnecessary for the mold of the present invention to use the stamper which would be otherwise used for the conventional mold for molding substrates for optical disks. Therefore, no problem occurs concerning the retardation and the distortion of the substrate caused, for example, by deformation of the stamper.

The substrate for the magnetic disk according to the present invention has the surface roughness corresponding to the recording area, which resides in Ra≦2.0 nm and Rmax≦22 nm. Accordingly, the substrate of the present invention is preferably used to produce the magnetic disk for high density recording for which the near contact system is necessary. The substrate for the magnetic disk according to the present invention can be produced by means of the injection molding method, for which it is unnecessary to perform, for example, the polishing step and the precise washing step which have been necessary to produce the conventional aluminum disk. Therefore, the substrate of the present invention is excellent in productivity. Further, the use of the resin material makes it possible to decrease the production cost. On the other hand, the preformat pattern and the landing zone texture necessary for starting the operation of the head can be formed as the concave-convex patterns on the resin substrate in accordance with the injection molding method. Therefore, the substrate of the present invention is preferable for mass production. Further, the substrate for the optical disk according to the present invention scarcely suffers from defects such as pin holes on the surface on the side on which no preformat pattern is formed. Therefore, the substrate as described above and the optical disk obtained therefrom are excellent in mechanical characteristics.

What is claimed is:

1. An injection molding mold for injection-molding a substrate for an information-recording disk, wherein:
    at least a part of a cavity surface for forming a recording surface of the information-recording disk in the mold has a surface roughness of $Ra \leq 2.0$ nm and $Rmax \leq 22$ nm.

2. The mold according to claim 1, wherein at least a part of the cavity surface for forming the recording surface of the information-recording disk in the injection molding mold is formed by metal plating, and the metal plating has a surface roughness of $Ra \leq 2.0$ nm and $Rmax \leq 22$ nm.

3. The mold according to claim 2, characterized in that the metal plating is Ni plating or Ni-alloy plating, and the metal plating has a film thickness t of $1 \mu m \leq t \leq 80 \mu m$.

4. The mold according to claim 2, characterized in that the metal plating has a Vickers hardness of not less than 300 Hv.

5. The mold according to claim 1 or 2, characterized in that at least at a part of the cavity surface has a concave-convex pattern.

6. The mold according to claim 5, characterized in that the concave-convex pattern corresponds to at least one of a landing zone texture for starting operation of a recording or reproducing head, a preformat pattern, and a data pattern.

7. The mold according to claim 5, characterized in that the concave-convex pattern has a height of 20 nm to 200 nm.

8. The mold according to claim 5, characterized in that the concave-convex pattern comprises the flat cavity surface, and projections formed thereon and composed of one metal selected from the group consisting of Ti, Ta, Al, and an alloy containing these elements.

9. A substrate for an information-recording disk, produced by using the mold as defined in claim 1.

10. A substrate for an information-recording disk, produced by using the mold as defined in claim 2.

11. An information-recording disk having the substrate as defined in claim 9.

12. An information-recording disk having the substrate as defined in claim 10.

13. The information-recording disk according to claim 10, wherein a glide height is not more than 40 nm.

14. A substrate for an information-recording disk, produced by using the mold as defined in claim 5.

15. An information-recording disk having the substrate as defined in claim 14.

16. The information-recording disk according to claim 15, wherein a glide height is not more than 40 nm.

17. A stamper for a mold used for molding a substrate for an information-recording disk by injecting and charging a molten resin into the mold, characterized in that:
    a part of the stamper to make contact with the molten resin had a Vickers hardness of not less than 500 Hv,
    wherein the stamper is composed of two layers having different Vickers hardnesses, and the layer disposed on a side to make contact with the molten resin has a Vickers hardness of not less than 500 Hv, and the layer disposed on a side to be installed to the mold has a Vickers hardness of not more than 300 Hv.

18. The stamper according to claim 17, characterized in that the layer disposed on the side to make contact with the molten resin is formed of a material selected from the group consisting of Ni—P, Ni—B, Ni—Co, and Co—Ag.

19. The stamper according to claim 17, characterized in that the layer disposed on the side to be installed to the mold is formed of pure Ni.

20. A method for producing a stamper composed of a low hardness layer having a Vickers hardness of not more than 300 Hv and a high hardness layer having a Vickers hardness of not less than 500 Hv, the method comprising:
    performing plating in accordance with an electroplating method by using plating baths having different bath compositions to form the high hardness layer and the low hardness layer respectively.

21. A stamper for a mold to be used for molding a substrate for an information-recording disk by injecting and charging a molten resin into the mold, wherein:
    a part of the stamper to make contact with the molten resin has a Vickers hardness of not more than 300 Hv, and a thickness of the stamper is not less than 0.4 mm.

22. The stamper according to claim 4, characterized in that a reinforcing plate is provided on a back surface of the stamper.

23. The stamper according to claim 22, characterized in that an Ag film is formed on the back surface of the stamper by means of sputtering, and the reinforcing plate is fixed via the Ag film to the back surface of the stamper by being heated to 200° C. or more.

* * * * *

UNITED STATES PATENT AND TRADEMARK OFFICE
CERTIFICATE OF CORRECTION

PATENT NO.    : 6,333,089 B1  Page 1 of 1
DATED         : December 25, 2001
INVENTOR(S)   : Hiroyuki Hirata et al.

It is certified that error appears in the above-identified patent and that said Letters Patent is hereby corrected as shown below:

<u>Title page,</u>
Item [75], Inventors, please make the following corrections from "Hiroyuki Hirata; Tatsuo Araki, both of Ohtsu; Osamu Ishizaki, Suita; Hideo Daimon, Ibaraki; Yasuhiko Kokufuda; Tsuyoshi Maro, both of Kyoto; Makoto Aihara, Fujisawa, all of (JP)" to
-- Hiroyuki Hirata; Tatsuo Araki, both of Ohtsu; Osamu Ishizaki, Suita; Hideo Daimon, Tsukuba-gun; Yasuhiko Kokufuda; Tsuyoshi Maro, both of Otokuni-gun; Makoto Aihara, Fujisawa, all of (JP) --

Item [73], Assignee, please change "Hitachi Maxwell, Ltd." to -- Hitachi Maxell, Ltd. --

Item [56], References Cited, U.S. PATENT DOCUMENTS, please add the following:
-- 5,981,015   11/1999    Zou et al. ......................... 428/64.2
   5,972,461   10/1999    Sandstrom ....................... 428/64.3
   5,714,218   02/03/1998 Nishio et al. ..................... 428/64.1 --.

Please add FOREIGN PATENT DOCUMENTS, as follows:

-- FOREIGN PATENT DOCUMENTS
63-255816A   10/24/1998   Japan
386912A      04/11/1991   Japan
64-50236A    02/27/1989   Japan
82-66369A    10/15/1996   Japan --.

Signed and Sealed this

Twenty-first Day of January, 2003

JAMES E. ROGAN
*Director of the United States Patent and Trademark Office*